Sept. 20, 1966         A. FISHER         3,274,412
              COMPOUND DIRECT CURRENT MOTORS
Filed Sept. 18, 1963                 3 Sheets-Sheet 1
FIG. I
PRIOR ART
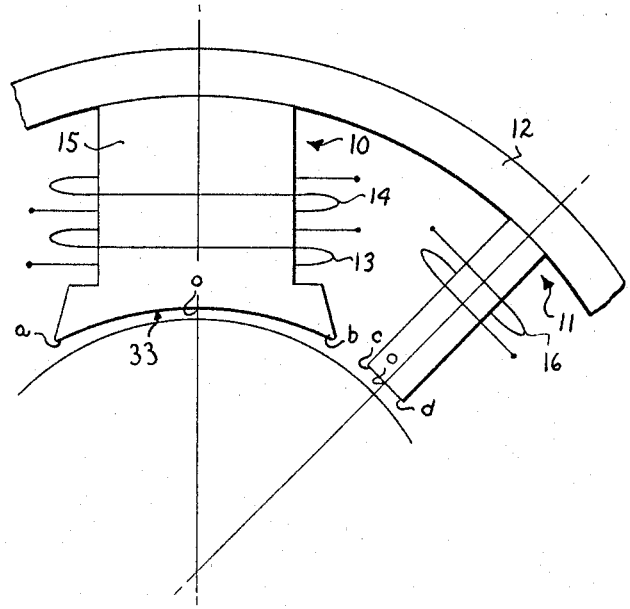
FIG. 2
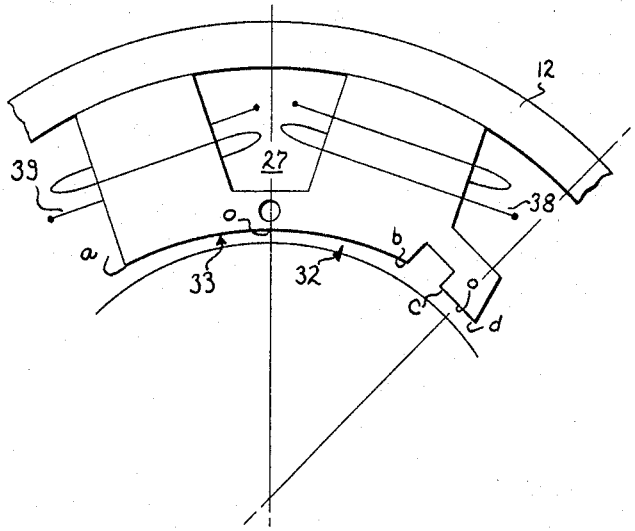
INVENTOR.
ALEC FISHER
BY *Joseph V. Claeys*
HIS ATTORNEY

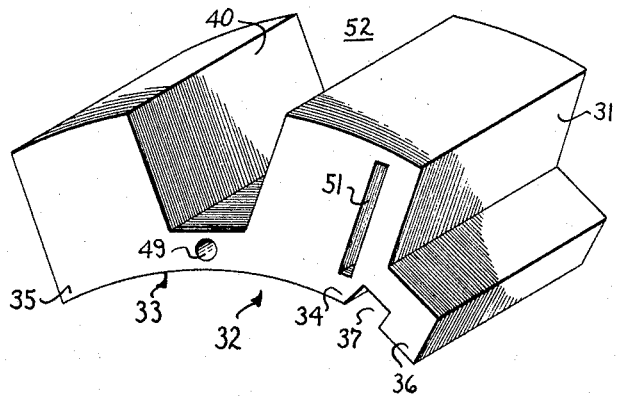
FIG. 4
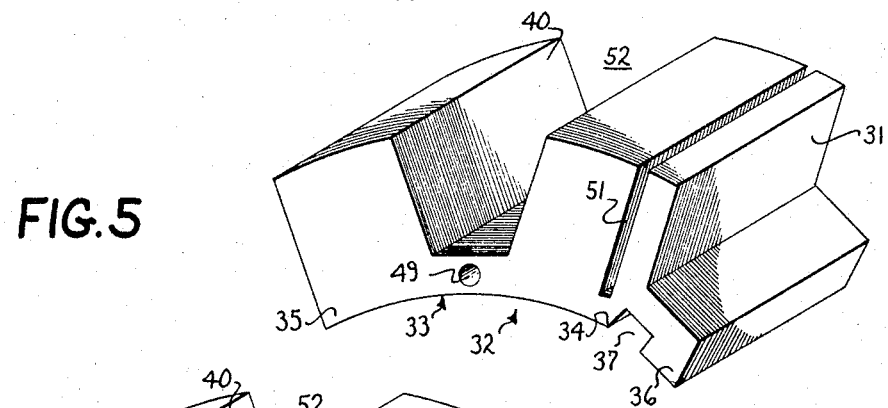
FIG. 5
FIG. 6
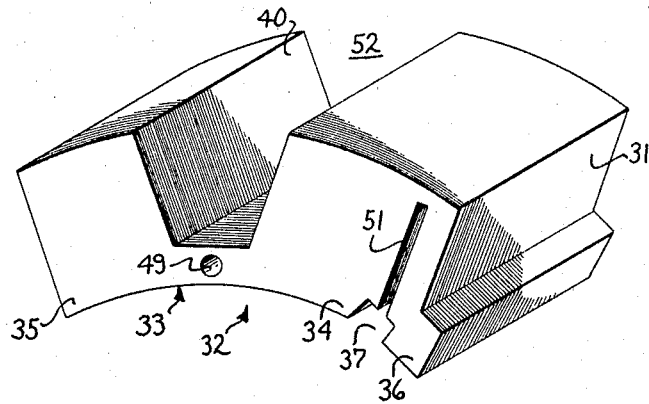
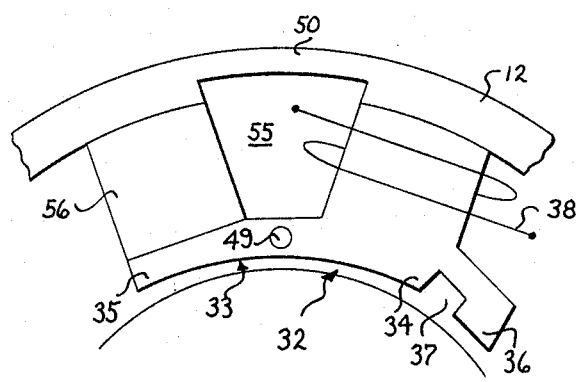
FIG. 7
INVENTOR.
ALEC FISHER
BY
HIS ATTORNEY United States Patent Office 3,274,412
Patented Sept. 20, 1966

3,274,412
COMPOUND DIRECT CURRENT MOTORS
Alec Fisher, Erie, Pa., assignor to General Electric Company, a corporation of New York
Filed Sept. 18, 1963, Ser. No. 309,837
5 Claims. (Cl. 310—186)

This invention relates to new and improved compound direct current motors exhibiting high performance and high ratios of armature-to-frame diameter.

In high performance compound motors constructed in accordance with prior art teaching, there has been an upper limit on the ratio of armature-to-frame diameter, and consequently an upper limit on the ratio of size-to-output, which could be obtained. This upper limit was imposed by the amount of space required for the main field poles, the commutating poles, usually placed midway between the main field poles, and the separate shunt, series and commutating pole windings. In addition, high performance motors often require armature reaction compensation so that an additional field winding, usually a pole face winding, is required. Prior art attempts to increase this ratio so as to provide motors of high output and small size and/or weight have not been successful since crowding the poles and windings into too small a space introduced additional problems due to insufficient ventilating air space. Accordingly, there is a continuing need for high performance compound direct current motors having higher ratios of armature-to-frame diameter and size-to-output.

It is an object of this invention, therefore, to provide new and improved compound direct current motors having a higher ratio of armature-to-frame diameter than heretofore achieved.

It is another object of this invention to provide a simpler and less expensive high performance compound direct current motor.

Briefly stated, in accordance with one aspect of this invention, the new and improved compound direct current motor comprises an excitation arrangement which is simpler and requires less space. Each of the main and commutating poles are provided in a single mechanically integrated magnetizable member with a first magnetic excitation means providing commutating pole flux, and a component of the main pole flux, and a second magnetic excitation means providing the constant component of the main pole flux. Means are further provided to limit the circulation of flux in the mechanically integrated magnetizable members between the first and second magnetic excitation means. The first magnetic excitation means comprises a winding connected in series with the armature circuit of the motor and placed on one portion of the magnetizable members. The second magnetic excitation means comprises either a permanent magnet or a shunt winding placed on another portion of the magnetizable members.

The novel features believed characteristic of this invention are set forth with particularity in the appended claims. The invention itself, however, together with further objects and advantages thereof, may best be understood by reference to the following description taken in connection with the accompanying drawings in which:

FIG. 1 is a diagrammatic illustration of a portion of a conventional prior art compound direct current motor;

FIG. 2 is a diagrammatic illustration of a similar portion of a compound direct current motor in accordance with one embodiment of this invention;

FIGS. 4, 5 and 6 are perspective views of mechanically integrated field members showing different configurations of high reluctance regions therein for improving a commutating ability of the motors of this invention; and FIG. 7 is a diagrammatic illustration of a portion of a compound direct current motor in accordance with another embodiment of this invention.

Figure 3:
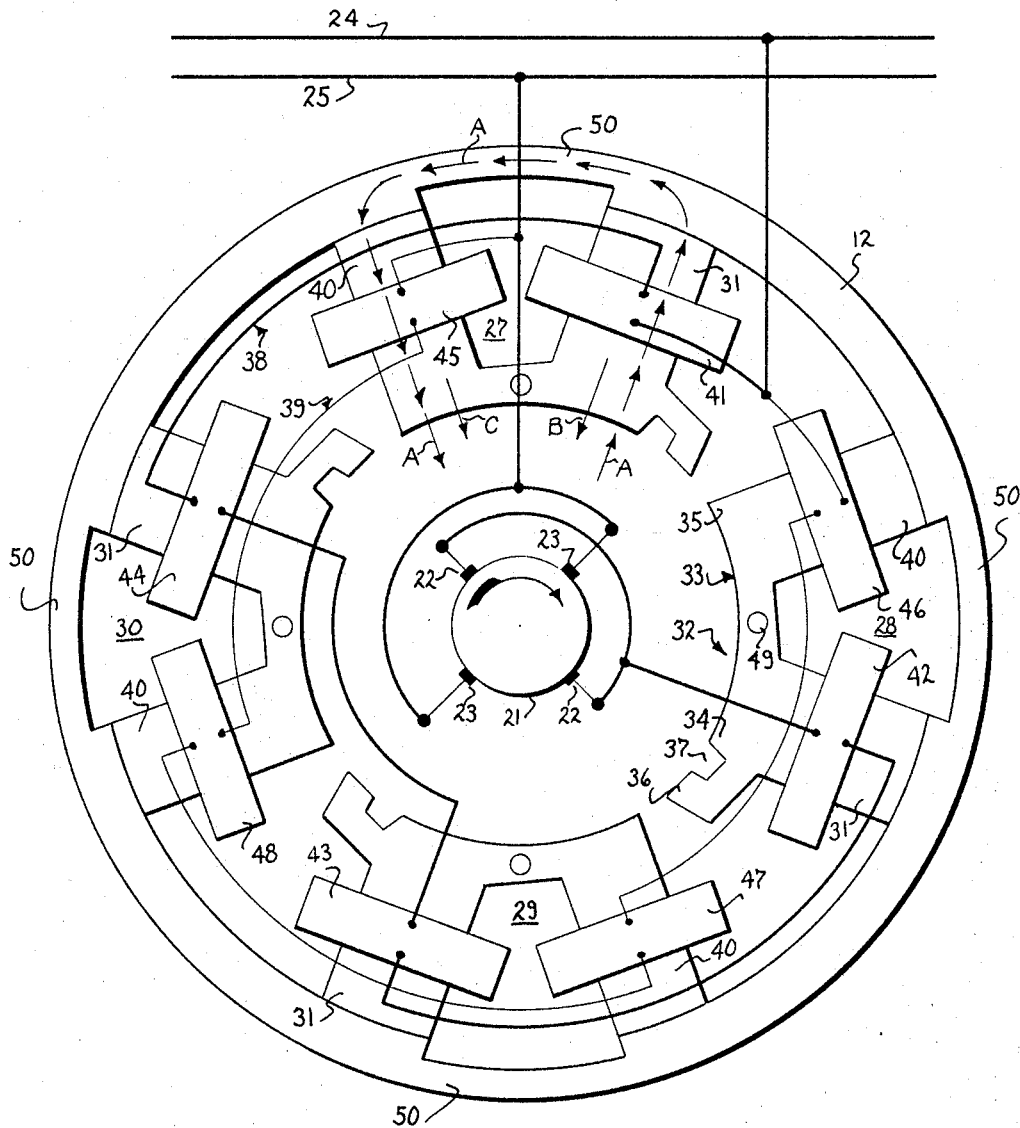
FIG. 3 is a more complete diagrammatic illustration of the compound direct current motor of FIG. 2.

As shown in FIG. 1 the conventional prior art compound direct current motor includes separate main field poles 10 and commutating poles 11 projecting from a field yoke 12. Although only one such main and commutating pole pair is shown, the number of such pole pairs will be determined by the number of poles of the motor. For example, a two-pole motor would have two main and two commutating poles while a four-pole motor would have four main and four commutating poles. Usually the commutating poles 11 are placed midway between the main field poles as shown.

Main field pole 10 has a pole arc defined by the pole face *a–o–b* while commutating pole 11 has a pole arc defined by the pole face *c–o–d*. Since the commutating poles 11 are spaced from the main field poles 10, a neutral zone defined by the points *b–c* is established so that commutation may take place.

First and second windings 13 and 14, connected respectively in series and parallel with the armature circuit of the motor, are placed on the core 15 of main field pole 10. These series and shunt field windings provide the required excitation so that the motor will exhibit compound characteristics. A third winding 16 connected in series with the armature circuit of the motor is placed on the commutating pole 11 and provides the required commutating pole flux to cause the generation of a voltage to neutralize the voltages which oppose commutation. If armature reaction compensation is desired, a fourth winding (not shown), placed in openings in the pole face of main field pole 10, would be provided.

In contrast to this prior art construction of FIG. 1, a view of a similar portion of a compound direct current motor in accordance with an embodiment of this invention is shown in FIG. 2. As shown, the main and commutating poles are combined into a single mechanically integrated, magnetizable field member, one of which is shown and generally designated 27. A single series field winding 38 is placed on a portion of the core of the member and provides commutating pole flux and a component of the main field pole flux. A second excitation means, shown as the shunt field winding 39 placed on another portion of the core, provides the constant component of the main field pole flux so that the motor will exhibit compound characteristics.

As in FIG. 1, the pole arc of the main field portion of the field member is defined by the same length pole face *a–o–b* and the pole arc of the commutating pole is defined by the same length pole face *c–o–d*. The neutral zone is provided by the notch defined by the points *b–c*. Thus, the pole arcs are the same length as in FIG. 1 although both the main and commutating poles are combined into a single mechanically integrated integrated field member.

As is evident from a comparison of FIGS. 1 and 2, less field space is required to accommodate the single field member, and less winding space is required since no separate commutating pole winding is necessary.

A more complete and detailed description of the present invention may be had by reference to FIG. 3. As shown in FIG. 3, the motor is provided with an armature of any desired type having a commutator 21 to which power is supplied by pairs of brushes 22—22 and 23—23 connected to the lines 24 and 25 of a suitable direct current power source. Magnetic excitation is provided to the armature by a field structure arranged as the stationary member of the motor.

The field structure includes the magnetic field yoke 12 and a number of mechanically integrated magnetizable field members, generally designated 27, 28, 29 and 30. Each of the field members 27 through 30 includes a main field pole portion and a commutating pole portion. Means are provided for exciting the field members to provide the required commutating pole flux and the necessary components of main field pole flux so that the motor will exhibit compound characteristics.

To this end, each of the field members 27 through 30 comprises a core leg portion 31 and a pole shoe region generally designated 32. The pole shoe region 32 includes the entire portion defined by the pole face a–o–b–c–o–d and terminates near the armature to define a main field pole shoe 33, including the portions 34 and 35, and a commutating pole shoe 36. A notch 37, extending the entire axial length of each of the magnetizable members, provides for a predetermined spacing between the main field pole shoe 33 and the commutating pole shoe 36. This separation provides for a suitable neutral zone so that the direct main pole flux and the quadrature commutating pole flux act independently, effectively shielding the armature coils undergoing commutation from the influence of the main pole flux.

In FIG. 3 field members 27 through 30 are shown disposed to provide a four pole machine. It will be understood, however, that the principles of this invention are applicable to motors having any number of poles.

Usually the polar members 27 through 30 are so constructed that the center of the commutating pole shoe 36 is on the line of the mechanical neutral of the motor as is well-known practice in the art. Further, although shown in FIG. 3, as being the same, the air gap between the commutating pole and the armature may be made different than the air gap between the main pole and the armature as is often done to increase the linearity between the magnetomotive force and the commutating pole flux.

The magnetizable members 27 through 30 are arranged to be magnetically excited by a first excitation means, generally designated as the windings 38, which provides the commutating pole flux and a component of the main pole flux which is essentially portional to motor current, and a second magnetic excitation means, shown as the winding 39 placed on a second core leg 40 of the magnetizable members 27 through 30. Winding 39 is connected in parallel with the armature circuit of the motor and so provides the constant, or shunt, component of the main pole flux. Alternatively, this second magnetic excitation means may be a permanent magnet placed on each of the magnetizable members adjacent the portion 35 of main pole shoe 33 thereof as will be more fully described hereinafter with reference to FIG. 7.

The first magnetic excitation means comprises the exciting winding 38, having the coils 41, 42, 43 and 44 connected in series and placed on the core legs 31 of the respective magnetizable members 27 through 30. Winding 38 is connected as shown so as to be in series with the armature circuit of the motor and provides a magnetomotive force which is proportional to motor line current. Accordingly, winding 38 is selected to provide a flux at the commutating pole shoe portions 36 which is sufficient to cause the generation of a voltage having a direction and magnitude to neutralize the voltages which oppose commutation in the coils of the armature undergoing commutation. As well known in the art, this neutralization need not necessarily be complete since the brush resistance may be utilized to aid commutation. The series pole section of the magnetic circuit, which includes the main pole, armature core, motor frame, teeth and air gap is so proportioned that the same magnetomotive force will produce the required flux from the same winding. The details and criteria for determining the proportions to meet this requirement are so well known in the art that they will not be described in further detail herein.

The second magnetic excitation means for providing the constant component of the main pole flux comprises the shunt winding 39. Winding 39 includes the coils 45, 46, 47 and 48 connected in series and placed on the core legs 40 of each of the members. Winding 39 is connected in parallel with the armature circuit of the motor and so provides the constant component of the main field pole ampere turns and flux. Alternatively, the winding 39 may be separately excited.

Under certain load conditions it is desirable to limit circulation of flux in the magnetizable members. This may be conveniently accomplished, when desired, by incorporating a high reluctance region in the main pole shoe 33 of each of the members 27–30 located intermediate the portions 34 and 35. In the various figures of the drawing this high reluctance region is shown for simplicity as the aperture 49. It will be understood, however, that a suitable means may also be provided by a reduction in the cross-sectional area of a region of the pole shoe portion 33, by apertures of other configuration, such as a slot for example, or other suitable means capable of limiting the circulation of flux between the portions of the magnetizable members associated respectively with the first and second magnetic excitation means.

To more clearly illustrate the operation and characteristics of the magnetic circuit of the compound direct current motors of this invention, the direction of the flux due to armature reaction is shown by the arrows A, the direction of the flux due to the series winding 38 is shown by the arrows B, and the direction of the flux due to the shunt winding 39 is shown by the arrows C. Thus, it will be observed that the magnetomotive force due to armature reaction is in opposition to the greater magnetomotive force due to series winding 38, in commutating pole shoe 36 and the portion 34 of main pole shoe 33. The magnetomotive force due to armature reaction, however, is in aiding relationship with the magnetomotive force due to shunt winding 39. The portion 35 of main pole shoe 33, therefore, is excited by winding 39 as well as by armature reaction. Since armature reaction aids the shunt excitation, a smaller shunt field coil than required to produce full flux in the conventional prior art structure of FIG. 1 may be employed. This further contributes to a reduction in the amount of field space required. Accordingly, by a suitable selection of the number of turns for the winding 38 the desired amount of commutating pole overcompensation may be provided. Also by suitable proportioning of the total magnetic circuit the same ampere turns of series winding 38 is selected to produce the required series ampere turns for the main field excitation. The effective series ampere turns are equal to the ampere turns of winding 38 minus the armature reaction ampere turns. The constant component of flux is provided by shunt winding 39 with a series component being provided by armature reaction and series winding 38 with the end result that the motor exhibits compound characteristics.

Since only a single mechanical integrated field member carries both the main and commutating poles, less field space is required than prior art constructions such as shown in FIG. 1 wherein a separate main field pole is employed with a separate commutating pole placed midway between the main field poles. Moreover, since only a single field winding is employed to produce main and commutating pole excitation, less winding space is required which contributes to savings in cost, size and weight. A further reduction in machine weight is possible with the compound motor structure of this invention by the reduction in cross-section of the regions 50 of field yoke 12. This is possible since in the motor structure of this invention this region of the magnetic circuit carries relatively low flux as may be seen by the flux path distribution in FIG. 3. In addition, the reduced regions 50 provide for additional ventilating air passages.

The excitation arrangement utilized in the compound direct current motors of this invention, therefore, is simpler and less expensive than the arrangements heretofore employed. The single series winding provides armature reaction compensation, which is required for high performance machines and which in the past required an additional field winding, commutating pole excitation, and a component of the main pole flux so that, in combination with the constant component of flux produced by shunt winding 39 and the additional flux due to armature reaction, the motor exhibits compound characteristics. Further, the magnetomotive force at the tip of main pole shoe portion 34 nearest the commutating pole shoe 36 is strong and in a direction which aids commutation thereby providing high commutating ability in a high performance, high armature reaction machine.

Further improvements in the commutating ability of the compound motors of this invention may be achieved by providing means in each of the field members 27 through 30 for establishing two essentially separate flux paths therein for the flux produced by the series winding 38. One path is established for the commutating pole flux and an essentially separate path is established for the component of the main pole flux. In this way saturation of the commutating pole portion is essentially independent of saturation of the main field pole portion of the field members 27 through 30. To this end, a high reluctance region 51, preferably an air gap, is provided in the core leg 31 of each of the field members 27–30. High reluctance region 51 is located intermediate the main and commutating pole shoes of the pole shoe region 32 and extends through a major port of the radial length of core leg 31 and through the entire axial length thereof. The location of the high reluctance region may be conveniently determined by first determining the size of the portion required to carry the component of the necessary main pole flux. The size of the portion required to carry the necessary commutating pole is then determined and these two portions are separated along a major part of their radial lengths by the high reluctance region 51. In this way both a main and commutating pole are provided in a single mechanically integrated magnetizable field member having essentially separate flux paths for the commutating pole flux and the component of the main pole flux produced by series winding 38 and the constant component of the main pole flux produced by the shunt winding 39.

Magnetizable field members for use in the compound direct current motors of this invention showing some suitable configurations which provide suitable high reluctance regions for improving the commutating ability are shown in FIGS. 4, 5 and 6. As shown, these field members generally designated 52 are similar to the members shown in FIGS. 2 and 3 but include high reluctance regions 51 suitably disposed in the core leg portion 31 thereof.

In FIG. 7 there is shown a diagrammatic view of a portion of a compound direct current motor in accordance with another embodiment of this invention. In FIG. 7 similar parts are identified by the same reference numerals as in FIG. 3. As shown in FIG. 7, the motor comprises a number of field members, generally designated 66, having a core leg 31 and a pole shoe region 32 terminating near the motor armature and defining a main field pole shoe 33, including the portions 34 and 35, and a commutating pole shoe 36 which is separated from the main field pole shoe 33 by the notch 37. As in the embodiment of FIG. 3, a series winding 38 is placed on the core leg 31 of each of the field members 55 and provides the required commutating pole flux and the component of main pole flux which is proportional to motor speed.

In place of the shunt winding 39, however, the constant component of the main field pole flux is provided by a permanent magnet 56 placed adjacent the portion 35 of main pole shoe 33. In this way a laminated pole face is conveniently provided for permanent magnet 56.

Circulation of flux in the field members 55 between the first and second magnetic excitation means thereof, series winding 38 and permanent magnet 56, is again limited by the high reluctance region 49. In addition, in this embodiment high reluctance region 49 also provides for a field member having an automatic "keeper" for permanent magnet 56 whenever the armature of the motor is removed. For example, if a definite magnetic path is not provided when the armature is removed from the motor, the permanent magnet would be required to operate on its minor loop. In the structure of this invention, however, the permanent magnet still has a definite magnetic path through the high reluctance region 49 of the field member to circulate its flux so that it always operates on its major loop thereby providing for a high degree of flux at all times.

Further, the structure of the compond motors of this embodiment unexpectedly results in permanent magnet 56 being further magnetized by the megnetomotive force due to armature reaction as the load is applied to the motor rather than being demagnetized as would be expected and as is usually the case when permanent magnets are employed. This further magnetization of permanent magnet 56 as the load is applied may be shown by reference to FIG. 3 and the flux paths depicted therein by the arrows A, B and C. By applying the flux path due to armature reaction to the structure shown in FIG. 7, it will be observed that this flux is in a direction to aid the flux produced by permanent magnet 56. Accordingly, this aiding flux, which is essentially proportional to motor speed, operates to further magnetize permanent magnet 56 as the load is applied to the motor.

In the embodiment shown in FIG. 7, therefore, only a single field winding is required to provide commutating pole flux and both portions of the main pole shoe with full excitation corresponding to that provided by a conventional compound motor since the constant component of the main field pole flux is provided by the permanent magnet 56.

While there have been described what are at present considered to be preferred embodiments of this invention, many changes and modifications will occur to those skilled in the art. It is intended in the appended claims, therefore, to cover all such changes and modifications as come within the true spirit and scope of the invention.

What I claim as new and desire to secure by Letters Patent of the United States is:

1. A compound direct current motor comprising:
   (a) an armature;
   (b) a plurality of magnetizable members arranged to coact with said armature, each of said members including a core and a pole shoe region terminating near said armature and defining spaced apart, mechanically integrated main and commutating pole shoes;
   (c) first magnetic excitation means arranged on a first core portion of each of said magnetizable members for providing a magnetomotive force which is proportional to motor current, said means being a winding connected in series with the armature circuit of said motor and providing commutating pole shoe flux and a component of the main pole shoe flux;
   (d) and a second magnetic excitation means associated with each of said magnetizable members, said second magnetic excitation means being a permanent magnet disposed adjacent and in contact with a portion of the main pole shoe of each of said magnetizable members.

2. A compound direct current motor comprising:
   (a) an armature;

(b) a plurality of magnetizable members arranged to coact with said armature, each of said members including a pole shoe region terminating near said armature and defining spaced apart, mechanically integrated main and commutating pole shoes;

(c) first magnetic excitation means, said means including a winding connected in series with the armature circuit of said motor and arranged on each of said magnetizable members so that the magnetomotive force produced by said winding provides commutating pole shoe flux for neutralizing the voltages which oppose commutation and a component of flux proportional to motor speed in said main pole shoe;

(d) permanent magnet means arranged on each of said magnetizable members so that the magnetomotive force thereof provides a constant component of flux;

(e) and a high reluctance region disposed in said main pole shoe of each of said magnetizable members and operative to limit circulation of flux therein between said first and second magnetic excitation means.

3. A compound direct current motor comprising:
(a) an armature;
(b) a plurality of main field poles arranged to coact with said armature and each including a bi-furcated core portion having first and second core legs terminating at one end near said armature to define a main pole shoe;
(c) a plurality of commutating poles one carried by each of said main field poles and having at least the pole shoe portion thereof spaced from said main pole in the direction of rotation of said armature;
(d) a first winding connected in series with the armature circuit of said motor and placed on the first core leg of each of said main field poles providing flux essentially proportional to motor speed in each of said main and commutating poles;
(e) a second winding connected in parallel with the armature circuit of said motor and placed on the second core leg of each of said main field poles to provide a constant component of flux therein;
(f) and a high reluctance region disposed in each of the main pole shoes intermediate the ends thereof for limiting the circulation of flux therein.

4. The compound direct current motor of claim 3 wherein each of said main field poles includes a second high reluctance region, said second high reluctance region being disposed in the first core leg portion thereof intermediate said main and commutating poles and extending along a major part of the radial length and through the entire axial length of said first core leg for establishing two essentially separate paths for the flux due to said first winding.

5. A compound direct current motor comprising:
(a) an armature;
(b) a plurality of magnetizable members arranged to coact with said armature, each of said members including a region terminating near the outer surface of said armature which defines spaced-apart, mechanically integrated main and commutating pole shoes;
(c) a core integral with the region of each of said magnetizable members which defines said main and commutating pole shoes;
(d) a winding connected in series with the armature circuit of said motor and arranged on the core of each of said magnetizable members for providing the desired commutating pole flux and series component of the main pole flux;
(e) a permanent magnet secured to the region of each of said magnetizable members defining said main and commutating pole shoes at a location remote from the commutating pole shoe portion thereof for providing the constant component of the main pole flux;
(f) and a high reluctance region disposed in the region of each of said members which terminates near said armature and at a location intermediate the ends of the main pole shoe for limiting the circulation of flux therein between the portion excited by said series winding and said permanent magnet.

References Cited by the Examiner

UNITED STATES PATENTS

| | | | |
|---|---|---|---|
| 1,045,159 | 11/1912 | Lundell | 310—224 |
| 1,244,868 | 10/1917 | Larson | 310—224 |
| 1,637,887 | 8/1927 | Wilson | 310—187 X |
| 1,994,609 | 3/1935 | Hobart | 310—186 |
| 2,030,108 | 11/1936 | Hathaway | 310—186 |
| 2,417,120 | 3/1947 | Naul | 310—187 X |

FOREIGN PATENTS

| | | |
|---|---|---|
| 20,820 | 7/1904 | Great Britain. |

MAX L. LEVY, *Primary Examiner.*

MILTON O. HIRSHFIELD, *Examiner.*

J. J. SWARTZ, *Assistant Examiner.*